(No Model.) 2 Sheets—Sheet 2.

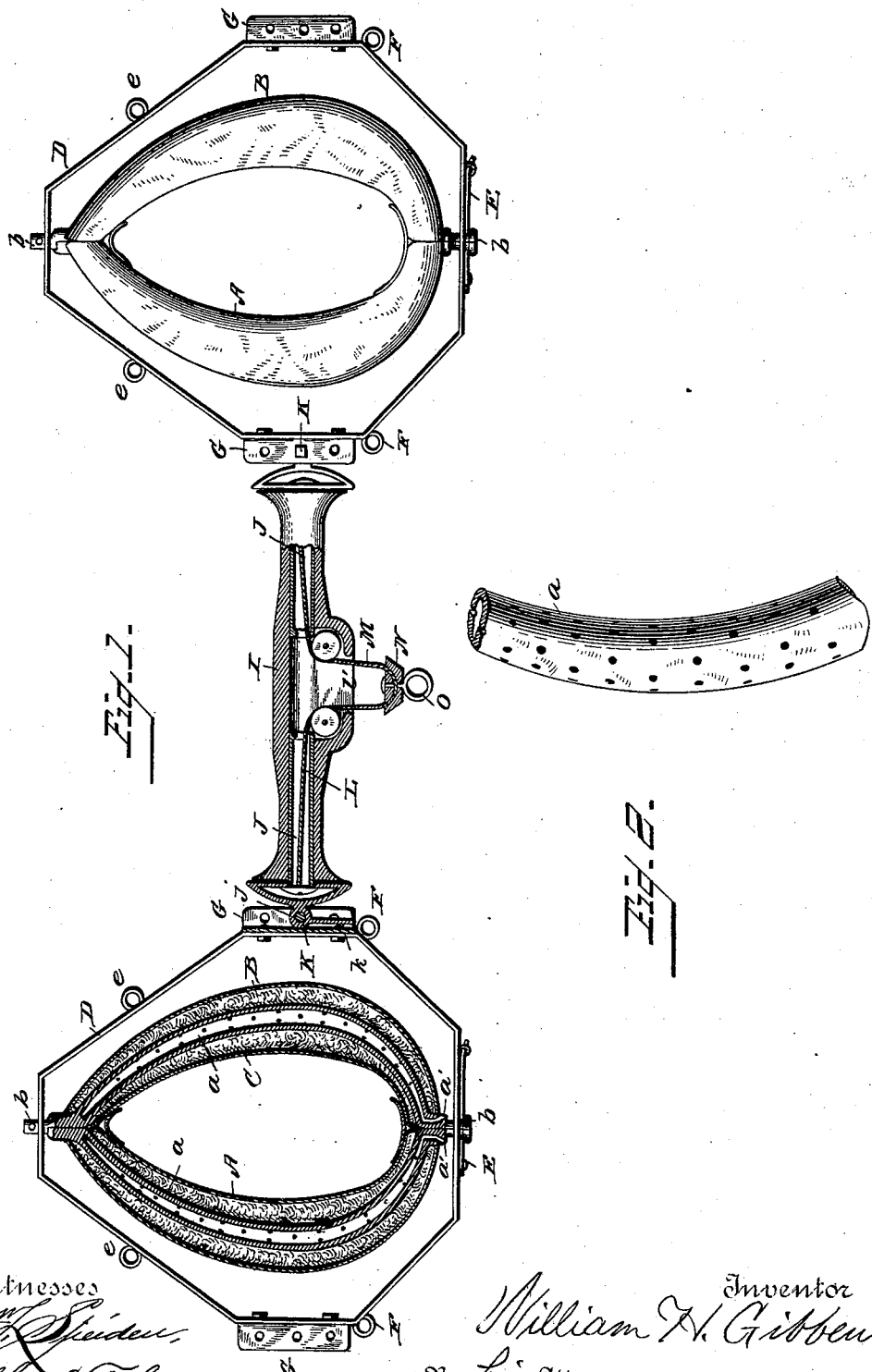

W. H. GIBBENS.
HARNESS.

No. 340,304. Patented Apr. 20, 1886.

Witnesses
Wm L Speiden
Alfred T Gage

Inventor
William H Gibbens
By his Attorney
Franklin D Hough

N. PETERS, Photo-Lithographer, Washington, D. C.

United States Patent Office.

WILLIAM H. GIBBENS, OF WATSON, NEW YORK.

HARNESS.

SPECIFICATION forming part of Letters Patent No. 340,304, dated April 20, 1886.

Application filed January 25, 1886. Serial No. 189,697. (No model.)

*To all whom it may concern:*

Be it known that I, WILLIAM H. GIBBENS, a citizen of the United States, residing at Watson, in the county of Lewis and State of New York, have invented certain new and useful Improvements in Harness; and I do hereby declare the following to be a full, clear, and exact description of the invention, such as will enable others skilled in the art to which it appertains to make and use the same, reference being had to the accompanying drawings, and letters of reference marked thereon, which form a part of this specification.

Similar letters of reference indicate like parts throughout the several views.

This invention relates to new and useful improvements in harness, and has for its objects to so construct and arrange the collar that the draft will not be applied directly thereto, but to a frame surrounding said collar, and in which it is free to turn to accommodate itself to the varying positions of the shoulder of the animal to which it is applied, thus preventing galling of the shoulder. When used in double harness, the frames, which are preferably of spring metal, are connected by a telescopic bar having pivotal connection with said frames.

Another object of the invention is to so construct the collar as to render it more durable and less liable to retain the heat imparted to it by the animal.

To these ends, and to such others as the invention may pertain, the same consists in the peculiar combinations, and the novel construction, arrangement, and adaptation of parts, as shown in the accompanying drawings, and more fully hereinafter described and claimed.

Figure 3:
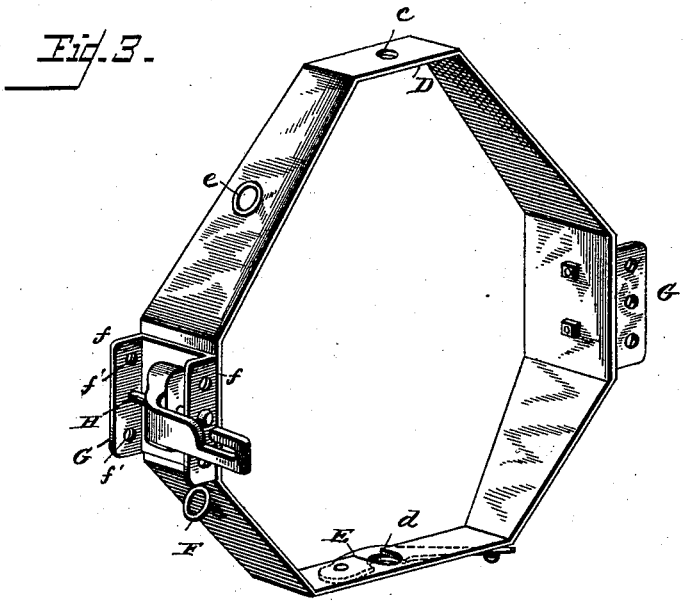
Figure 4:
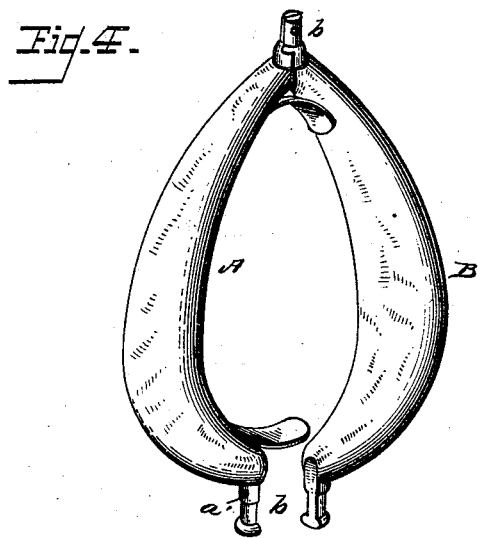

In the said drawings, which form a part of this specification, Figure 1 is a front elevation, partly in section, of a portion of a double harness embodying all of my improvements. Fig. 2 represents a portion of the perforated hame detached. Fig. 3 is a perspective view of the frame detached, and Fig. 4 is a similar view of the collar.

Referring to the drawings by letter, A designates the collar, which consists of the hollow metallic jointed hames $a$, which are perforated, as shown, and provided with an air-inlet, $a'$, the filling B, and covering C, said filling and covering being of ordinary construction. The hames project through the covering at the top and bottom of the collar to form pivots $b$, by means of which said collar is swiveled in a frame, as hereinafter described. By this construction I provide a collar which is cheap to manufacture, one that is more durable, as the air is permitted to circulate freely through the interior of the collar, thus preventing the possibility of molding and rendering the collar more durable, cooler, and more comfortable for the animal upon which it is used.

D represents a light frame, preferably of spring metal, and preferably, although not necessarily, of substantially the shape shown. This frame at its top is provided with an aperture, $c$, to receive one of the pivot-pins, $b$, of the collar. The bottom of this frame, in vertical line with the aperture $c$, is provided with an open-sided slot, $d$, to receive the other pivot-pin of the collar.

E is a locking-lever, which may be of any approved or well-known form, pivoted to the bottom of the frame and designed to hold the collar in place in said frame. I claim nothing novel in the form of this locking-lever.

Rings $e$ are secured upon opposite sides of the frame to receive and serve as guides for the reins.

F F are similar rings for attaching the holdbacks when the use of holdback-straps is necessary.

G G are plates secured to the sides of the frame, as shown, by bolts or any suitable securing means. Each of these plates is provided with two wings, $f f$, provided with a plurality of holes, $f' f'$, coincident with each other.

H is a removable pin, designed to engage any two of these holes for the purpose of securing the attaching means, as shown.

When used as single harness, the attachments are secured one to each of the plates G, in the manner shown at one side of the frame in Fig. 3, and to these attachments the tugs or tug-chains are connected in the ordinary way.

I do not limit myself to any particular form of draft attachments, as it is evident that other forms than that shown—buckles, for instance—may be employed.

When used as a double harness, the frames are connected preferably in the following manner: I is a tube or bar open at both ends. J J are tubes of smaller diameter fitting in the said tube I, the united lengths of said tubes J J being less than that of the tube I. Each of the tubes J J is formed with a hollow head, preferably convex, and provided with an eye, $j$. K is a bolt passing through said eye and coincident holes in the wings of the plate G, and by this means the frames are pivotally secured together. A plate, $k$, projects downwardly from the eye $j$, and serves as a stop to limit the motion of the connecting bar or tube in one direction.

Whenever in the following description and claims I use the term "connecting-bar," I wish to be understood as meaning a connection substantially like that above described—that is, one that will automatically adjust itself and allow free lateral motion of the frames and collars. This self-adjusting connection is important, as it allows great freedom of the animals without in anywise galling or otherwise injuring them.

L is a rope passed through the tubes J J, with its bight M projecting through the aperture $i$ in the under side of the tube I, as shown. N is a block, through which the bight of said rope is passed loosely, and depending from said block is an eye, O, designed to receive and support the end of the tongue, and it also furnishes a means for attaching the draft-chain. The ends of this rope, after passing through the tubes J J, are secured to buttons or similar devices within the heads of said tubes, as shown.

With a device of this kind it will readily be understood that, the collar being pivoted within the frame and the draft applied to the frame instead of directly to the collar, the collar is permitted to follow and adjust itself to the movements of the animal, thus preventing the possibility of wearing or galling. The draft will be evenly distributed, and the use of tugs and whiffletrees is dispensed with. The collar and its frame are adapted for use either singly or in pairs. The spring-frames and telescopic connecting-bar allow of a free lateral motion, and the pivotal connection between the two frames allows of an oscillating or rolling motion, which is particularly desirable.

While I prefer to use in connection with my spring-frame the collar herein described, because of its superior advantages, I wish it distinctly understood that I do not limit myself to the use of such collar in connection therewith, as it is evident that any other could be used, provided it had pivot-pins by which it could be swiveled in the frame; neither do I intend to limit myself to the precise construction shown and described, as it is evident that the same might be varied without departing from the spirit of my invention. For instance, instead of using the block N and eye O, the pole might be made to be supported directly by the bight of the rope.

Having thus described my invention and set forth its merits, what I claim as new is—

1. In a harness, hames having swivels at their vertical extremities and inclosed within a collar, substantially as described.

2. The combination, with swiveled hames surrounded by a collar, of a frame surrounding the same, substantially as described.

3. The combination, with a frame, of swiveled hames within a collar removably supported thereby and inclosed therein, substantially as described.

4. The combination, with a frame, of swiveled hames, detachably supported thereby and inclosed within a collar, and means for locking said hames to the frame, substantially as described.

5. The combination, with hames within a horse-collar, of a frame surrounding and supporting the same, and provided with draft attachment independent of the said collar and hames, substantially as described.

6. In a harness, two frames, hames inclosed within a collar swiveled within each frame, and a self-adjusting telescopic draft attachment connected with said frames, substantially as described.

7. The combination, with the two frames and the swiveled hames inclosed within collars and supported thereby, of a telescopic bar, substantially as specified, having pivotal connection with said frames, substantially as described.

8. The combination, with the two frames and a telescopic bar connecting the same, of a rope having its ends attached to the sliding parts of said bar and adapted to support in its bight the pole, substantially as described.

9. The combination, with two spring-frames and hames within collars swiveled therein, of a bar directly connected to said frames and provided with draft attachment, substantially as described.

10. A horse-collar provided with an interior perforated hame provided with pivots and adapted to serve substantially as and for the purpose specified.

11. The combination, with swiveled hames inclosed within a collar, of a spring-frame inclosing and supporting the same and provided with means, as specified, for detachably securing the draft attachments, substantially as described.

12. The combination, with two spring-frames and hames inclosed within collars swiveled therein, of a self-adjusting telescopic connection, as specified, between said frames, substantially as described.

13. The combination, with two spring-frames and hames inclosed within collars swiveled therein, of a self-adjusting telescopic bar, as specified, pivotally connected to said frames, substantially as described.

14. The combination, with the spring-metal frame, and the hames swiveled therein and enclosed within the collar, of the plates G, secured to the sides of said frame, and the removable pins H, whereby said frame is adapted for use singly or in pairs, as set forth.

15. The spring-frame having the hames inclosed within a collar and swiveled within said frame, said frame having secured to its opposite sides, as shown, the plates G, each plate provided with a plurality of holes, $ff'$, substantially as and for the purpose specified.

In testimony whereof I affix my signature in presence of two witnesses.

WILLIAM H. GIBBENS.

Witnesses:
C. R. McCulloch,
J. A. Williams.